US012698668B2

(12) United States Patent
Paul et al.

(10) Patent No.: US 12,698,668 B2
(45) Date of Patent: Aug. 4, 2026

(54) REMOTELY OPERATED DOOR OPENING SYSTEM

(71) Applicant: Hands Free, Inc., Peoria, IL (US)

(72) Inventors: Pierre Paul, St. Louis, MO (US); Kelly Mallon, Downers Grove, IL (US)

(73) Assignee: Hands Free, Inc., Peoria, IL (US)

( * ) Notice: Subject to any disclaimer, the term of this patent is extended or adjusted under 35 U.S.C. 154(b) by 0 days.

(21) Appl. No.: 19/095,384

(22) Filed: Mar. 31, 2025

(65) Prior Publication Data

US 2025/0305344 A1 Oct. 2, 2025

Related U.S. Application Data

(60) Provisional application No. 63/571,559, filed on Mar. 29, 2024.

(51) Int. Cl.

| | |
|---|---|
| ***E05F 15/63*** | (2015.01) |
| ***E05F 15/76*** | (2015.01) |
| ***E05F 15/77*** | (2015.01) |

(52) U.S. Cl.

CPC .............. *E05F 15/63* (2015.01); *E05F 15/76* (2015.01); *E05F 15/77* (2015.01); *E05Y 2201/10* (2013.01); *E05Y 2600/626* (2013.01)

(58) Field of Classification Search

None

See application file for complete search history.

(56) References Cited

U.S. PATENT DOCUMENTS

| | | | | |
|---|---|---|---|---|
| 3,188,682 A * | 6/1965 | Check | E05F 3/00 | 16/49 |
| 4,660,324 A * | 4/1987 | Nyenbrink | E05F 15/63 | 49/340 |
| 4,727,679 A * | 3/1988 | Kornbrekke | E05F 15/63 | 49/340 |
| 5,392,562 A * | 2/1995 | Carambula | E05F 3/22 | 248/300 |
| 5,634,296 A * | 6/1997 | Hebda | E05F 15/63 | 49/28 |
| 6,061,964 A * | 5/2000 | Arnell | E05F 15/63 | 49/358 |
| 6,125,505 A * | 10/2000 | Jensen | E05F 3/227 | 16/DIG. 40 |
| 6,430,871 B1 * | 8/2002 | Hebda | E05F 15/63 | 49/340 |

(Continued)

FOREIGN PATENT DOCUMENTS

| | | | |
|---|---|---|---|
| CA | 2543592 A1 * | 10/2006 | H02J 7/14 |
| CA | 2844947 A1 * | 8/2014 | E05F 15/63 |

(Continued)

*Primary Examiner* — Catherine A Kelly

(74) *Attorney, Agent, or Firm* — Benjamin D. Rotman; UB Greensfelder LLP

(57) ABSTRACT

The present invention comprises a mountable, moveable remotely operated door opening system. The system in general comprises a housing unit, a motor, a clutch system, a rotary shaft, a power source, and a control hub. The control hub is coupled to the power source and is configured to relay electrical and control signals to the motor. The control hub comprises a microprocessor or controller, memory, and a wireless receiver configured to receive and relay control commands from an external computing device.

20 Claims, 4 Drawing Sheets

(56) References Cited

U.S. PATENT DOCUMENTS

| | | | | |
|---|---|---|---|---|
| 6,553,717 | B2 * | 4/2003 | St. John | E05F 15/603<br>49/340 |
| 6,634,140 | B1 * | 10/2003 | Sellman | E05F 15/41<br>49/340 |
| 6,891,479 | B1 * | 5/2005 | Eccleston | E05F 15/63<br>340/545.1 |
| 6,967,587 | B2 * | 11/2005 | Snell | E05F 3/224<br>340/925 |
| 8,011,741 | B2 * | 9/2011 | Mattle | E05D 15/46<br>312/328 |
| 8,169,317 | B2 * | 5/2012 | Lemerand | E05F 15/70<br>340/521 |
| 8,720,113 | B1 * | 5/2014 | Krivoy | E05F 15/63<br>49/339 |
| 11,661,786 | B2 * | 5/2023 | Langenberg | E05F 15/63<br>49/31 |
| 11,686,142 | B2 * | 6/2023 | Griswold | E05F 17/004<br>49/70 |
| 12,110,727 | B2 * | 10/2024 | Hass | E05F 15/75 |
| 12,281,514 | B2 * | 4/2025 | Stern | E05B 17/10 |
| 12,291,916 | B2 * | 5/2025 | Tien | E05F 3/227 |
| 2002/0092237 | A1 * | 7/2002 | Hebda | E05B 17/0029<br>49/340 |
| 2008/0148641 | A1 * | 6/2008 | Furlanetto | E05F 15/63<br>49/358 |
| 2009/0265992 | A1 * | 10/2009 | Hass | E05F 15/63<br>318/610 |
| 2014/0325911 | A1 * | 11/2014 | Hass | E05F 15/63<br>49/31 |
| 2017/0130511 | A1 * | 5/2017 | Squires | E05F 15/63 |

FOREIGN PATENT DOCUMENTS

| | | | | | |
|---|---|---|---|---|---|
| DE | 102014109572 | A1 | * | 1/2015 | E05F 3/227 |
| DE | 202016107335 | U1 | * | 3/2018 | E05F 15/63 |
| EP | 1493892 | B1 | * | 1/2009 | E05B 53/003 |
| EP | 2450516 | A1 | * | 5/2012 | E05F 15/63 |
| EP | 2746513 | A1 | * | 6/2014 | E05F 15/611 |
| ES | 2345898 | T3 | * | 10/2010 | E05F 15/603 |
| FR | 2701732 | A1 | * | 8/1994 | E05F 15/41 |
| GB | 2236142 | A | * | 3/1991 | E05F 15/603 |
| WO | WO-2006099645 | A1 | * | 9/2006 | E05F 15/63 |
| WO | WO-2011057652 | A1 | * | 5/2011 | E05F 15/63 |

* cited by examiner

REMOTELY OPERATED DOOR OPENING SYSTEM

CROSS-REFERENCE TO RELATED APPLICATION

The present application claims priority to and the benefit of U.S. Provisional Application No. 63/571,559, filed Mar. 29, 2024, the contents of which are incorporated herein by reference and made a part hereof.

BACKGROUND OF THE INVENTION

The present invention generally relates to accessibility devices. More particularly the present invention relates to a remotely operated door opening system.

An automated accessible door is a door designed to open and close automatically, making it easier for people with disabilities or mobility challenges to enter and exit buildings. These doors are often equipped with accessible push buttons to facilitate operation. They are commonly found in public buildings, hospitals, shopping centers, and other places where accessibility is a priority.

One of the issues with existing push button systems includes the accessibility of the button itself. While public businesses work to comply with ADA requirements, the ability to approach the button and push the button itself may be difficult for those with certain disabilities.

Another issue is that traditional hardwired automatic door openers are energy-intensive, consuming 175-350 watts per operation, and require extensive retrofitting. They lack modularity and modern connectivity features, making them impractical for smaller businesses or residential use. The size and weight of traditional systems typically require the door opening system to be mounted to the door frame or wall above the door frame, requiring a substantial amount of space to mount a traditional system. In retrofitting a door, space above the door may be substantially limited, especially in residential retrofitting.

The present invention addressed these issues with a low-energy, modular design that includes enhanced connectivity and accessibility features.

SUMMARY OF THE INVENTION

In view of the above, a mountable, moveable remotely operated door opening system is provided. The system in general comprises a housing unit, a motor, a clutch system, a rotary shaft, a power source, and a control hub. The control hub is coupled to the power source and is configured to relay electrical and control signals to the motor. The control hub comprises a microprocessor or controller, memory, and a wireless receiver configured to receive and relay control commands from an external computing device.

In some aspects, the system is removably coupled to a door through a mounting plate and mounting bracket allowing constraining the system in lateral and negative vertical movement, but allowing for the system to easily be lifted off the door. The system is then coupled to a wall or door frame through an articulating linkage member.

In some aspects, the external computing device comprises a transmitter fob, mobile phone, computer, or tablet device. Further, in some aspects the external computing device comprises software configured to accept a voice command and transmit the control signal to the control hub.

In some aspects, the motor is configured to run in a low power mode such that each door opening operation is completed in less than 100 watts.

In some aspects a method of remotely opening a door include the steps of sending a control signal to a remotely operated door opening system mounted to a door and coupled to the door frame through an articulating linkage member, the remotely operated door opening system comprising a housing unit, a motor, a clutch system, a rotary shaft, a power source, and a control hub having a wireless receiver, the control hub receiving the control signal through the wireless receiver, directing power from the power source to the motor, the motor driving the rotary shaft, which in turn drive the articulating linkage member to open the door.

BRIEF DESCRIPTION OF THE DRAWINGS

In the accompanying figures, like elements are identified by like reference numerals among the several preferred embodiments of the present invention.

Other aspects and advantages of the present invention will become apparent upon consideration of the following detailed description, wherein similar structures have similar reference numerals.

DETAILED DESCRIPTION OF THE PREFERRED EMBODIMENTS

The foregoing and other features and advantages of the invention will become more apparent from the following detailed description of an exemplary embodiment, read in conjunction with the accompanying drawings. The detailed description and drawings are merely illustrative of the invention rather than limiting, the scope of the invention being defined by the appended claims and equivalents thereof.

Figure 1:
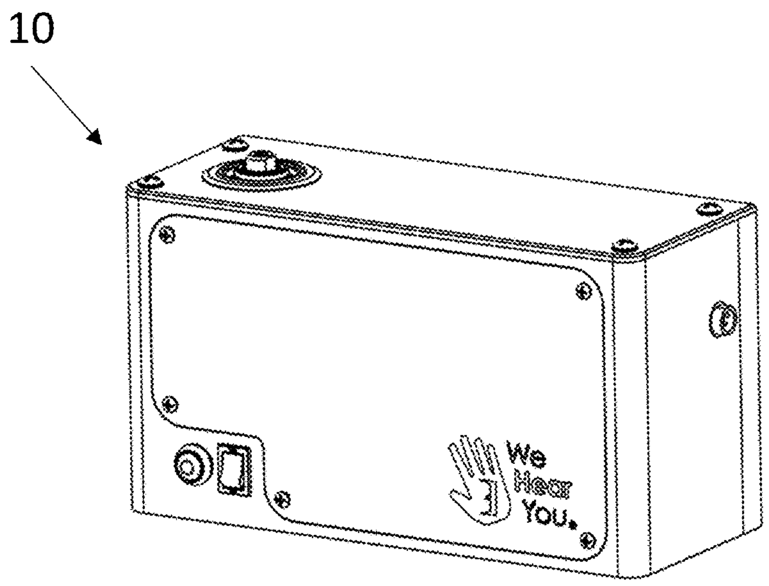
FIG. 1 illustrates an example remotely operated opening system.
Figure 2:
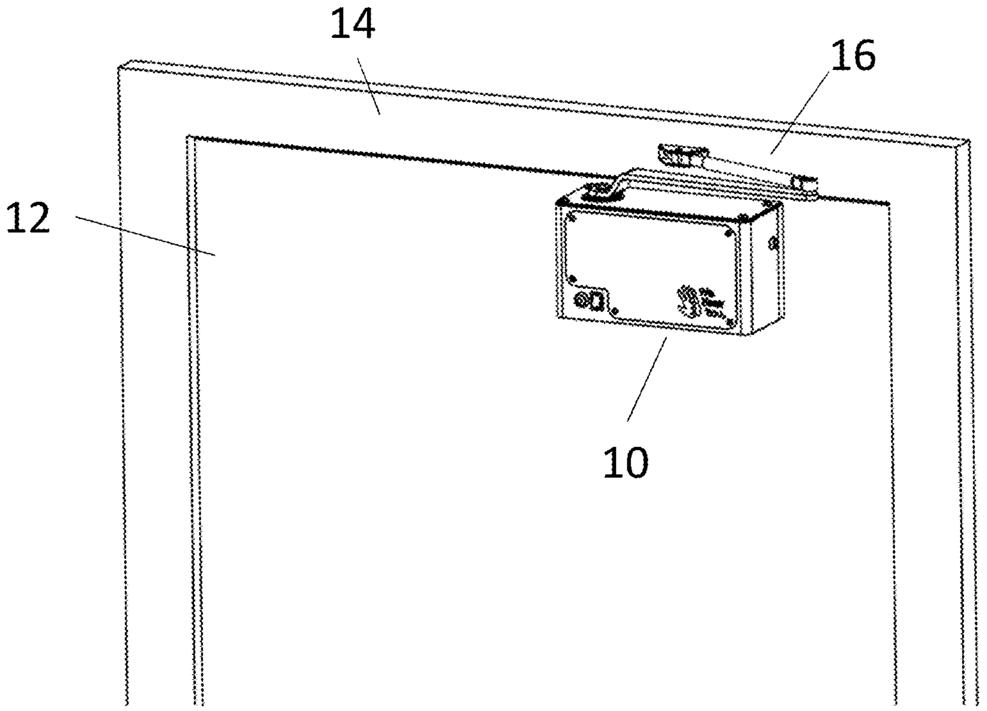
FIG. 2 illustrates an example remotely operated door opening system mounted to a door.

FIG. 1 and FIG. 2 display the remotely operated door opening system 10 as well as the remotely operated door opening system 10 mounted to door 12. As shown, the remotely operated door opening system 10 is mounted to directly to door and coupled to the door frame 14 through an articulating linkage member 16. One of skill in the art would recognize that the articulating linkage member 16 may be coupled to a wall outside the door frame 16 as well as long there is proper space to articulate into an open position.

Figure 3:
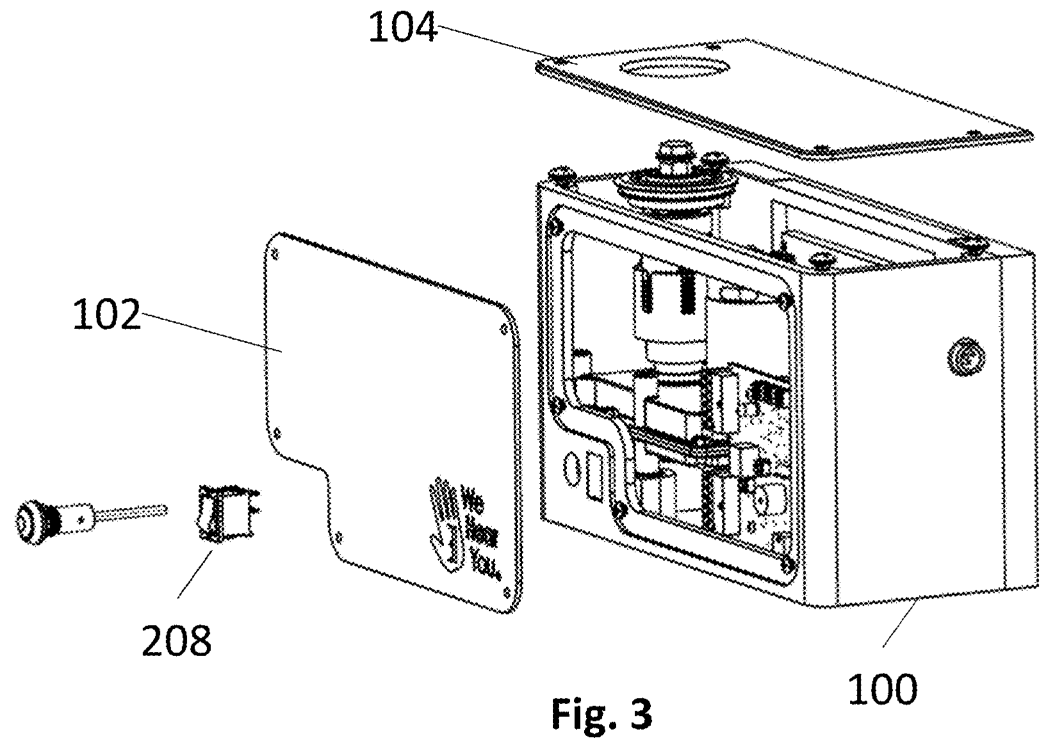
FIG. 3 illustrates an exploded view of an example an example remotely operated opening system.
Figure 4:
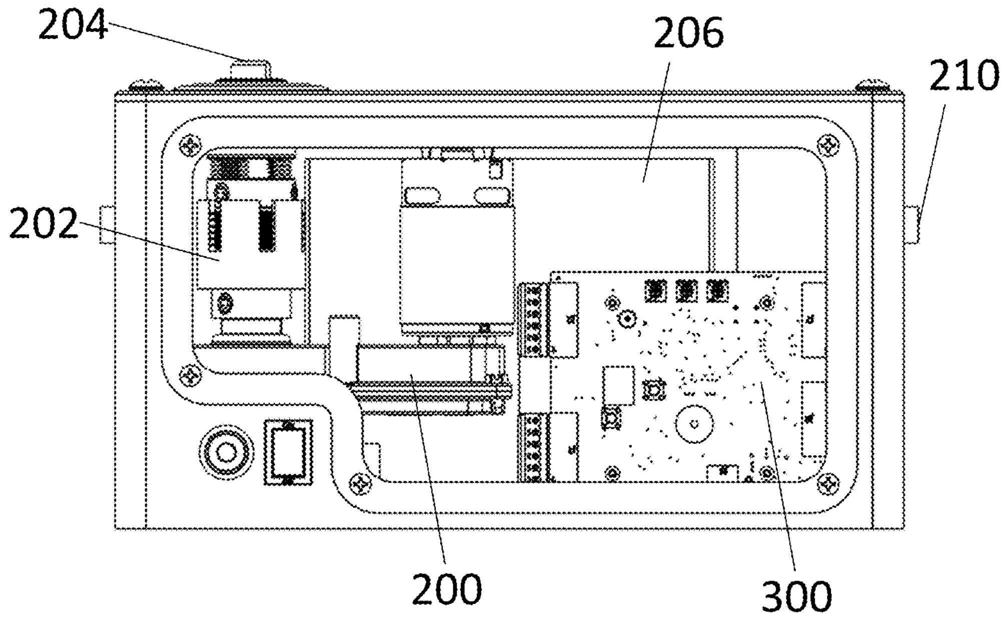
FIG. 4 illustrates an open front view an example remotely operated opening system.

FIG. 3 and FIG. 4 show an exploded perspective view and an open front view of the remotely operated door opening system 10. As shown, the remotely operated door opening system 10 comprises a housing unit 100, a motor 200, a clutch system 202, a rotary shaft 204, power source 206 and a control hub 300. In some aspects, the system 10 additionally comprises an external power connector 210 configured to supply power to the power source 206 or to supplement or replace the power source 206. The power source 206 may be any kind of replaceable or rechargeable battery. In one aspect, The lead acid battery charging circuit is driven by a MC34063 DC-to-DC converter containing an internal temperature compensated reference, comparator, controlled duty cycle oscillator, an active peak current limiting circuit, and a high current output switch. The lead acid battery is charged initially at a constant current of nominally 300 mA which is below the maximum charge current for the battery of 360 mA. Eventually the battery voltage will rise, and the charge mode will switch over to constant voltage with the maximum voltage set at 13.86 volts. There is a resettable fuse, with a 1.5 A holding current and a 3.0 A trip current, in-line with the battery for safety. The output of the charging circuit illuminates a green LED indicating that the battery charger is working. The battery 206 is used to supply the current necessary to drive the motor 200, 1.4 A max typically.

Figure 5:
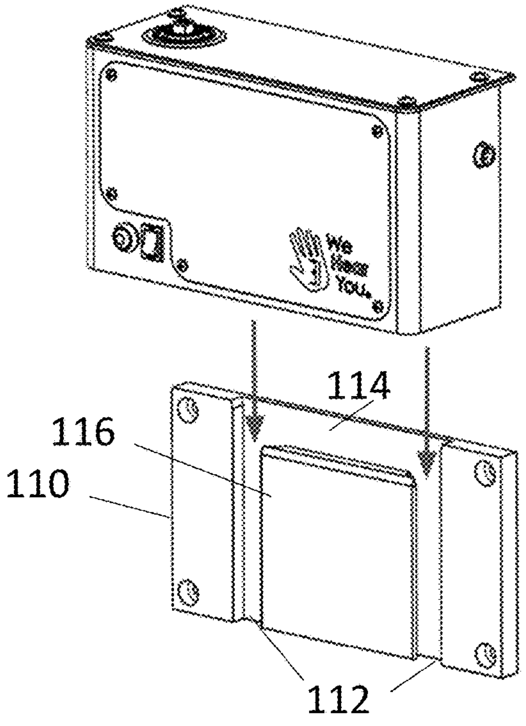
FIG. 5 illustrates a front perspective view of an example remotely operated door opening system and mounting plate.
Figure 6:
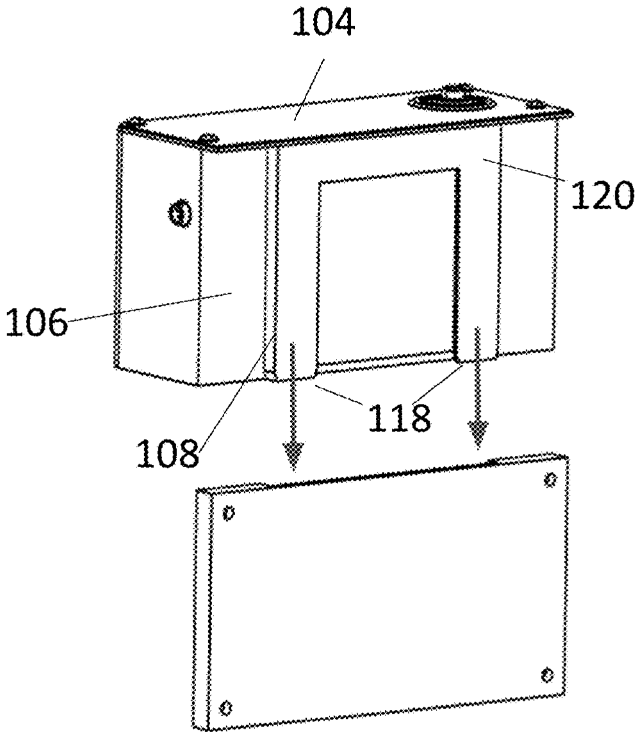
FIG. 6 illustrates a rear perspective view of an example remotely operated door opening system and mounting plate.
Figure 7:
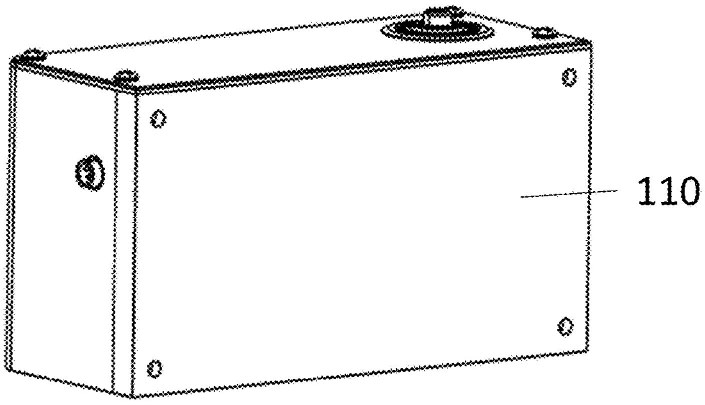
FIG. 7 illustrates a rear perspective view of an example remotely operated door opening system and mounting plate.

In some aspects, the housing unit 100 comprises a removable front accessibility plate 102 and a removable top accessibility plate 104. Further as shown in FIGS. 5-7 the housing unit may comprise a mounting bracket 108 coupled to the housing rear surface 106. The mounting bracket 108 is configured to engage with a door mounted mounting plate 110. When engaged with the mounting plate 110, the top plate 104 or the mounting bracket 108 constrains movement of the system 10 in the negative vertical direction while the mounting plate 104 constrains movement of the system 10 in lateral directions. In one aspect the mounting plate 110 is comprises with a pair of vertical rails 112, a horizontal rail 114 and a security member 116. The mounting bracket 108 comprises a pair of vertical protrusions 118 and a horizontal protrusion 120 configured to fit into the vertical and horizontal rails 112, 114, and engage with the security member 116.

As shown, the motor 200, is disposed within and coupled to the housing unit 100. The clutch system 202 is coupled to the motor 200 at a first end, and coupled to the top plate 104 at a second end. As shown in the cross section of FIG. 2, FIG. 5, the rotary shaft 204 is disposed within the clutch system 202 and coupled to the motor 200 through clutch system 202. The control hub 300 is disposed within and coupled to the housing unit 100 and electrically and communicatively coupled to the motor 200 and the power source 206. The motor 200 is electrically coupled to the power source 206 through the control hub 300. The power source 206 is coupled to the housing unit 100. In some aspects, the remotely operated door opening system 10 further comprises a power switch 208 electrically coupled to the power source 206 configured to couple or decouple the power source 206 to the control hub 300 upon actuation. The power source 206 may be charged through external power connector 210. The system 10 may be charged in place or easily removed from the mounting plate 110 and brought to an external charging station. The motor 200 itself is driven by a control module integrated into control hub 300, reducing energy consumption when compared to a traditional wired system. In some aspects, in connection with the control hub 300 the motor 200 operates at less than 100 watts per door opening operation. The control module may be a common controller or power management IC including but not limited to INFINEON TECHNOLOGIES BTM9010EPXUMA1.

Figure 8:
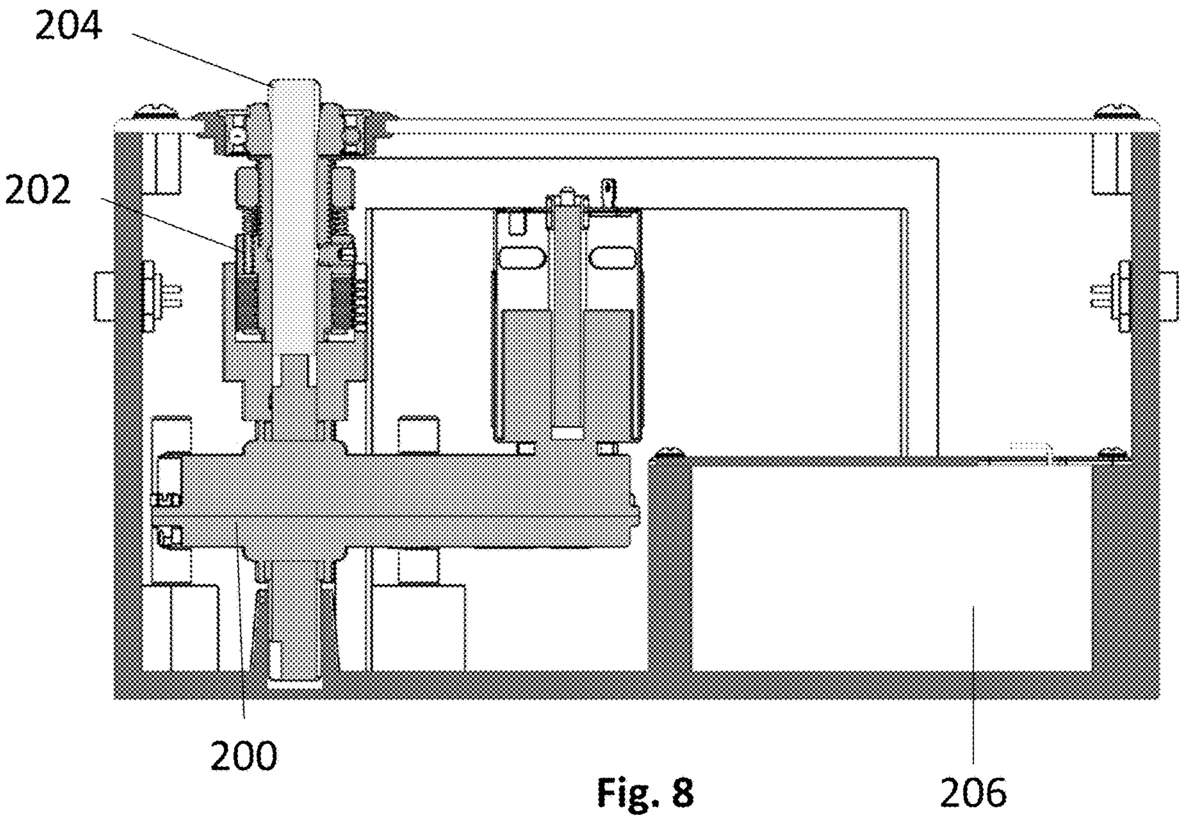
FIG. 8 illustrates a lateral cross-section of an example remotely operated door opening system through the clutch system.

In one aspect, as shown in the cross-section of FIG. 8, the clutch system 202 employs a mechanical slip clutch with an axial loaded multi-plate design as a safety device. The clutch system 202 limits the door opening and closing force to a safe level. If something is obstructing the door, the increased resistance will cause the clutch system 202 to slip. The clutch system 202 also allows the door to be manually opened and closed with minimal resistance. The clutch system 202 has an adjustable torque setting that allows for more torque for heavier doors and less torque for lighter doors.

The control hub 300 comprises a controller or microprocessor, memory, and a wireless receiver. The wireless receiver may comprise any common forms of wireless transmission radios including but is not limited to a Bluetooth or Bluetooth Low Energy (BLE) radio, a WiFi radio, a LoRa radio, an Ultra Wide Band (UWB) radio, or a cellular radio. The control hub 300 may be configured for a predefined opening angle by configuring the time of rotation of the of the motor 200. In some aspects this is done through the use of a potentiometer by adjusting the resistance. In another aspect the control hub 300 may be configured to stay open for a predefined period of time before reversing the motor 200 and driving the door 12 into a shut position. In yet another aspect, through close time may be adjusted through the use of a potentiometer by adjusting the resistance such that the door may close in the event that it has been slowed down by an obstruction in its path.

The control hub 300 is configured to receive door open controls from either a wired push button, or wirelessly from an external computing device through the wireless receiver. When the control hub 300 is powered on, the control hub waits for a control signal from a wired push button or an external computing device through the wireless receiver, receives the external control signal from the wired push button or an external computing device, transmits the signal to the controller or microprocessor, the controller or microprocessor relays the control signal to the motor 200 thereby rotating the rotary shaft 204. As the rotary shaft 204 rotates, the articulating linkage member 16 is articulated, thereby opening the door 12.

The external computing device may be any device configured with a wireless transmitter keyed into the same frequency as the wireless receiver of the control hub 300. In one aspect the external computing device is a simple fob with a single push button configured to transmit a control signal. In another aspect the external computing device may be a smart phone with an integrated software application configured to send the control system upon a push of a virtual button on the graphical user interface. In yet another aspect, the external computing device may be a smart phone with an integrated software application configured to receive voice commands and transmit the control signal.

In yet another aspect of the system 10 the control hub 300 may further be coupled to a microphone configured to receive a vocal command to open the door. The microphone would transmit the vocal command to the controller or microprocessor which would in turn interpret the command as a control command to relay to the motor 200. In other aspects, the external computing device may be authenticated and paired with the control hub 300 through common BLE or RFID mechanisms such that only pre-authenticated users can open the door with their external computing device or voice command.

In some aspects a method of remotely opening a door include the steps of sending a control signal to a remotely operated door opening system 10 mounted to a door 12 and coupled to the door frame 14 through an articulating linkage member 16, the remotely operated door opening system 10 comprising a housing unit 100, a motor 200, a clutch system 202, a rotary shaft 204, a power source 206, and a control hub 300 having a wireless receiver, the control hub 300 receiving the control signal through the wireless receiver, directing power from the power source 206 to the motor 200, the motor 200 driving the rotary shaft 204, which in turn drive the articulating linkage member 16 to open the door 12. The step of sending the control signal may further include the step of activating a transmitter fob or a software application coupled to a transmitter on an external computing device, to transmit the control signal to the control hub 300. The step of sending the control signal may further include the step of the external computing device software interpreting a vocal command into a control command and transmitting the control command as a control signal to the control hub 300.

Those of ordinary skill in the art will understand and appreciate the aforementioned description of the invention has been made with reference to a certain exemplary embodiment of the invention, which describe a remotely operated door opening system method of use. Those of skill in the art will understand that obvious variations in construction, material, dimensions or properties may be made without departing from the scope of the invention which is intended to be limited only by the claims appended hereto.

The invention claimed is:

1. A remotely operated door opening system comprising:
- a housing unit having a front surface, a back surface, a top surface, a bottom surface, and a pair of side surfaces;
- a control hub coupled to or disposed within the housing unit, the control hub having a microprocessor or controller, memory, and a wireless receiver;
- a power source coupled to or disposed within the housing unit, the power source electrically coupled to the control hub;
- a motor coupled to and disposed within the housing unit, the motor electrically coupled to the control hub and electrically coupled to the power source through the control hub;
- a clutch system disposed within the housing unit and coupled to the motor at a first end, and the top surface at a second end;
- a rotary shaft disposed within the clutch system configured to be driven by the motor;
- a mounting plate configured to be mounted to a door, the mounting plate comprising a pair of vertical rails, a horizontal rail, and a security member;
- a mounting bracket coupled to the back surface of the housing unit, the mounting bracket comprising a pair of vertical protrusions and a horizontal protrusion, the vertical protrusions and horizontal protrusions configured to engage the security member; and
- wherein the mounting plate restricts lateral movement and negative vertical movement of the mounting bracket.

2. The remotely operated door opening system of claim 1 wherein the control hub is configured to receive a control signal through the wireless receiver and relay electricity from the power source to the motor thereby driving the rotary shaft.

3. The remotely operated door opening system of claim 2 wherein the housing unit is mounted to a door, and an articulating linkage member is coupled at a first end to the rotary shaft, and at a second end to a door frame.

4. The remotely operated door opening system of claim 2 wherein the wireless receiver is one of a Bluetooth or Bluetooth Low Energy (BLE) radio, a WiFi radio, a LoRa radio, an Ultra Wide Band (UWB) radio, or a cellular radio.

5. The remotely operated door opening system of claim 2 wherein the wireless receiver is configured to receive the control signal from an external computing device utilizing a matching wireless transmission protocol as the wireless receiver.

6. The remotely operated door opening system of claim 5 wherein the external computing device comprises a push-button fob and wireless transmitter wherein upon actuation of the push-button the wireless transmitter sends the control signal to the control hub.

7. The remotely operated door opening system of claim 5 wherein the external computing device comprises a smart phone, tablet, or computer having a software module comprising a graphical user interface of a push-button wherein upon user activation of the push-button, the software module commands the external computing device wireless transmitter to send the control signal to the control hub.

8. The remotely operated door opening system of claim 5 wherein the external computing device comprises a smart phone, tablet, computer, or fob having a microphone and a software module configured to interpret a vocal command into the control signal, relay the control signal to the wireless transmitter, and transmit the control signal to the control hub.

9. The remotely operated door opening system of claim 5 wherein the control hub is configured to authenticate the control signal received from the external computing device prior to accepting the control signal.

10. The remotely operated door opening system of claim 9 wherein the control hub further comprises a microphone and a software module configured to interpret a vocal command into the control signal.

11. The remotely operated door opening system of claim 10 wherein the control hub accepts the vocal signal if the control hub detects an authenticated external computing device.

12. The remotely operated door opening system of claim 1 wherein the power used by the motor in a door opening operation is less than 100 watts.

13. The remotely operated door opening system of claim 1 wherein the clutch system comprises a mechanical slip clutch configured to decouple the rotary shaft from the motor after upon exceeding a predefined torque.

14. The remotely operated door opening system of claim 1 wherein the power source is a replaceable or rechargeable battery.

15. A method of remotely opening a door comprising the steps of:
- obtaining a remotely operated door opening system to a door, the remotely operated door opening system comprising:
- a housing unit having a front surface, a back surface, a top surface, a bottom surface, and a pair of side surfaces;
- a control hub coupled to or disposed within the housing unit, the control hub having a microprocessor or controller, memory, and a wireless receiver;
- a power source coupled to or disposed within the housing unit, the power source electrically coupled to the control hub;
- a motor coupled to and disposed within the housing unit, the motor electrically coupled to the control hub and electrically coupled to the power source through the control hub;
- a clutch system disposed within the housing unit and coupled to the motor at a first end, and the top surface at a second end;

a rotary shaft disposed within the clutch system configured to be driven by the motor; and wherein the control hub is configured to receive a control signal through the wireless receiver and relay electricity from the power source to the motor thereby driving the rotary shaft;

mounting a mounting plate to a door, the mounting plate comprising a pair of vertical rails, a horizontal rail, and a security member;

mounting the remotely operated door opening system to the door by engaging a mounting bracket coupled to a back surface of a housing unit with the mounting plate, the mounting bracket comprising a pair of vertical protrusions and a horizontal protrusion, the vertical protrusions and horizontal protrusion configured to engage the vertical rails, horizontal rail, and the security member, wherein the mounting plate restricts lateral movement and negative vertical movement of the mounting bracket;

coupling the remotely operated door opening system to a door frame or wall by coupling an articulating linkage member to the rotary shaft at a first end, and the door frame or wall on a second end;

sending the control signal from an external computing device having a wireless transmitter to the wireless receiver;

receiving the control signal through the wireless receiver and relaying the control signal through the control hub to the motor; and driving the rotary shaft through the motor to articulate the articulating linkage member into an open position.

16. The method of claim 15 wherein the external computing device comprises a smart phone, tablet, or computer having a microphone and a software module configured to interpret a vocal command into the control signal and wherein the step of sending the control signal comprises the steps of presenting a vocal command and triggering the software module to command the external computing device wireless transmitter to send the control signal to the control hub.

17. The method of claim 15 wherein the external computing device comprises a smart phone, tablet, or computer having a software module comprising a graphical user interface of a push-button and wherein the step of sending the control signal comprises the steps of activating the push-button and triggering the software module to command the external computing device wireless transmitter to send the control signal to the control hub.

18. A door mounted remotely operated door opening system comprising:

a housing unit having a front surface, a back surface, a top surface, a bottom surface, and a pair of side surfaces;

a control hub coupled to or disposed within the housing unit, the control hub having a microprocessor or controller, memory, and a wireless receiver;

a power source coupled to or disposed within the housing unit, the power source electrically coupled to the control hub;

a motor coupled to and disposed within the housing unit, the motor electrically coupled to the control hub and electrically coupled to the power source through the control hub;

a clutch system disposed within the housing unit and coupled to the motor at a first end, and the top surface at a second end;

a rotary shaft disposed within the clutch system configured to be driven by the motor;

a mounting plate mounted to a door;

a mounting bracket coupled to the back surface of the housing unit, the mounting bracket coupled to the mounting plate;

an articulating linkage member coupled at a first end to the rotary shaft, and at a second end to a door frame or wall; and wherein the control hub is configured to receive a control signal through the wireless receiver and relay electricity from the power source to the motor thereby driving the rotary shaft and articulating the articulating linkage member into an open position.

19. The door mounted remotely operated door opening system of claim 18 further comprising an external computing device having a wireless transmitter having a software module comprising a graphical user interface of a push-button wherein upon user activation of the push-button, the software module commands the external computing device wireless transmitter to send a control signal to the control hub.

20. The door mounted remotely operated door opening system of claim 18 further comprising an external computing device having a wireless transmitter having a microphone and a software module configured to interpret a vocal command into a control signal, relay the control signal to the wireless transmitter, and transmit the control signal to the control hub.

* * * * *